Nov. 16, 1965   R. TOUVAY   3,218,144
GLASS TANK FURNACES WITH SUBMERGED HEATING AND COOLING MEANS
Filed June 19, 1962   2 Sheets-Sheet 1
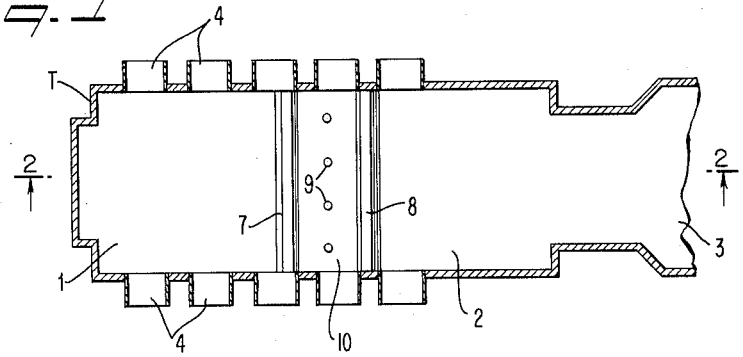
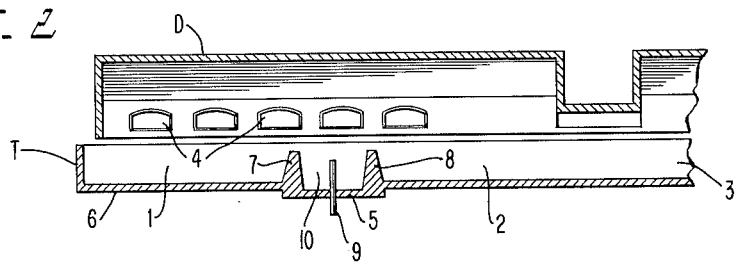
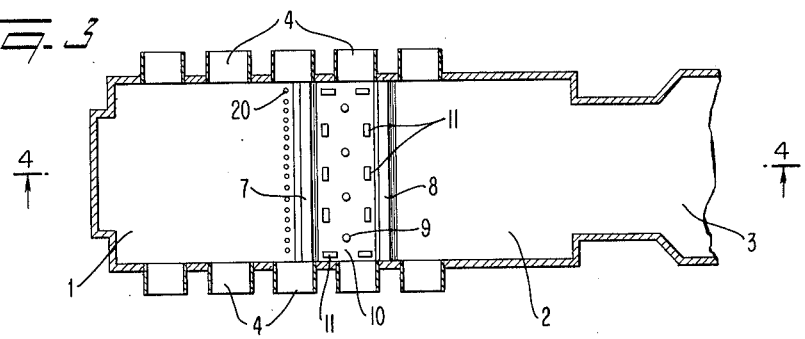
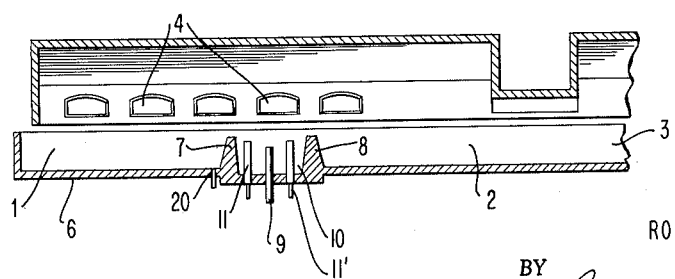
INVENTOR.
ROBERT TOUVAY
BY
*Bauer and Seymour*
ATTORNEYS INVENTOR.
ROBERT TOUVAY
BY
Bauer and Seymour
ATTORNEYS 3,218,144
GLASS TANK FURNACES WITH SUBMERGED
HEATING AND COOLING MEANS
Robert Touvay, Paris, France, assignor to Compagnie de
Saint-Gobain, Neuilly-sur-Seine, France
Filed June 19, 1962, Ser. No. 203,526
Claims priority, application France, June 21, 1961,
865,607
7 Claims. (Cl. 65—347)

This invention relates to tank furnaces and particularly to those which are used in the manufacture of glass and similar materials. As the furnace is particularly adapted to the manufacture of glass it will be described in that relation.

It is an object of the invention to produce glass by a continuous flow which has particular qualities of homogeneity, possessing which it is particularly well adapted to the production of flat glass by rolling, extrusion, casting, or drawing. The furnace is particularly adapted to the production of colored flat glass.

The objects of the invention are accomplished, generally speaking, by a glass furnace having a chamber for molten glass, with vertical walls, electrodes in the chamber adapted to heat the glass by Joule effect, and cooling means operatively interposed between the electrodes and the walls. The objects are also attained by a method of making glass by a continuous flow process which comprises melting raw materials in a melting zone, flowing only the surface glass into a deeper homogenizing zone and heating and cooling it there, and flowing only the surface glass from the homogenizing zone to a plaining zone.

In a preferred form of the invention a tank furnace is provided of elongated shape, at one end of which raw materials are added and at the other end of which the finished glass is withdrawn. Such furnaces have zones which are usually called the melting zone, where the raw materials are melted, the fining zone where the glass is perfected, and the working zone where the perfected glass is brought to a temperature and condition suitable for the making of articles. The improvement in the present case includes the establishment, in the region of the furnace which is usually called the fining zone, of a chamber which is deeper than the parts of the furnace above and below it, and which has transverse walls extending to a position near the surface of the bath so that the only flow into and from the chamber is at the surface. This compartment is provided at its lower level, particularly at its bottom, with electrodes operating by Joule effect. The electrodes may penetrate the furnace below the level of the bath through the sole or through the sides, in one case being vertical and in the other being horizontal. Vertical mounting is preferred and is shown in the drawings. When the electrodes in this compartment are mounted horizontally it is preferred that they should be admitted through the walls of the compartment which are below the level of the adjacent parts of the furnace.

The novel compartment has the effect of producing an energetic working of the glass and a superior homogenization and because of this superiority it will be called the homogenizing compartment.

The convection currents which are produced in the homogenizing compartment are intensified because the heat is produced at the bottom of the bath and the currents of glass are largely confined within the compartment. It is my discovery that the increase in the depth of the compartment has a substantial beneficial effect. I have also discovered that the portion of the compartment which is below the general level of the furnace has a substantial cooling effect and that this cooling effect is also beneficial. In effect the glass heated by the input of electrical energy in the lower part of the chamber is raised to the surface as a current, extends itself in all directions at the surface and redescends along the confining walls.

During this operation the surface of the glass may be heated in the usual ways, for instance by flame.

The velocity of the convection currents is the result of different factors, including the input of electrical energy and the cooling of the walls of the compartment. I have also discovered that the velocity of the currents can be increased, the result being improvement, and the walls protected against the activity of the currents of molten glass by inserting cooling means in the compartment about the walls. The depth of the homogenizing compartment below the general level of the furnace may be, for example, 20 to 80% of the depth of the glass in the adjacent compartment. This additional depth operates on two of the factors to regulate the speed of the currents, the depth of the bath and the cooling of the lateral walls; consequently, the depth of the central chamber can be proportioned to the type of glass, particularly to the color of the glass, which is being made and to the degree of homogenization which is to be obtained. When colored glass is being made which is relatively impermeable to radiation the depth of the zones above and below the homogenizing compartment will be small and the extra depth of the homogenizing compartment will be relatively large, but in making clear glass the proportions will be less.

The cooling of the exposed part of the lateral walls, below the general level of the furnace, may be accomplished by exposure to air or by forced cooling by ventilation, water sprays and water circulation.

The length of the homogenizing compartment measured along the furnace may be considerably shorter than the melting compartment upstream. It is sufficient in some cases to make the homogenizing compartment about half the length of the melting compartment, whereas in certain other cases the length of 1/6 of that of the melting compartment suffices.

According to another characteristic of the invention it is possible to still further accelerate the convection currents in the homogenizing compartment by the use of cooling means which are spaced about its walls, in the space which separates the electrodes from the walls themselves. These cooling means may conveniently be rod-like and internally cooled. They serve to establish different rates of flow for the descending currents, those adjacent the cooling rods being rapid and those adjacent the walls being slower. There are thus differences of flow in the descending currents which are favorable to homogenization. The cooling means may be disposed uniformly about the whole compartment, in which case the electrodes may be aligned transversely of the furnace between the ranks of coolers.

In one embodiment a series of vertical electrodes is introduced into the homogenizing compartment through the bottom in a staggered series extending across the furnace, the cooling rods being themselves staggered with respect to the electrodes. The electrodes may be aligned in a single line or they may occupy non-symmetrical positions depending upon the functions which they are to perform, and by giving them non-symmetrical positions with respect to an axis of the furnace the glass may have imparted to it motion not only vertical but also horizontal.

The electrodes and the cooling rods are preferably introduced through the bottom of the homogenizing compartment and their height and their sizes are selected according to the speed of the currents of convection which are to be generated and the direction of the currents. The cooling rods have an additional effect of protecting the walls against erosion.

The invention achieves an intense working of the glass in a restricted zone of the furnace which has a shorter dimension longitudinally of the furnace than was customary for prior fining zones. In this restricted zone there is achievable an intensity of local heating conditions and local velocities of currents without disturbing the thermal conditions and the velocities of glass which are desirable in the other parts of the furnace. As a result of the invention it is possible to reduce the depth of the parts of the furnace upstream and downstream, to reduce the losses of heat, to reduce the speeds of circulation of the glass, and to reduce the amount of glass, the reduction of the amount of glass in the furnace contributing to a material reduction in fuel costs.

When the cooling of the transverse walls of the homogenizing compartment sets up perturbations such as local inversions in the longitudinal movements of the glass in the adjacent compartments, the invention also includes the use, outside the walls of the compartment, of devices capable of controlling the convection currents to counterbalance the cooling action of these walls. Thus, immediately above the upstream wall of the compartment, in the melting compartment, one may employ a line of electrodes or of bubblers. In the plaining zone downstream of the homogenizing compartment, where the release or disappearance of the last bubble occurs, one may use near the wall of the compartment some electrodes which offset the cooling effect of the wall and prevent the glass which flows out of the homogenizing compartment from descending along the wall.

The bubblers or electrodes may be used not only to counterbalance the cooling action of the walls but equally may be used to accelerate or to oppose the natural convection currents when it is necessary to increase, modify or reverse these currents to attain an optimum result. Mechanical impellers can also be mounted in these compartments in place of the bubblers or electrodes.

It is to be observed that the transverse walls extend into the upper levels of the bath and to a distance below the glass level which is between several percent and 30% of the depth of the homogenizing compartment, a distance which in the usual case is between about 5 and 40 cm. This disposition is advantageous in that the homogenizing compartment is supplied by the hottest surface glass coming from the melting zone, and in that it delivers to the plaining zone the hot surface glass, from the homogenizing chamber, which because of its temperature tends to remain on the surface where it is most easily freed of its remaining bubbles. Particularly, this flow of glass supplies the surface currents which flow toward the working end of the furnace where the shaping instruments are located.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a plan view partly in section of a furnace constructed in accordance with this invention;

FIG. 2 is a vertical sectional view on line 2—2 of FIG. 1;

FIG. 3 is a plan view partly in section of another form of the invention;

FIG. 4 is a vertical sectional view on line 4—4 of FIG. 3;

Figure 5:
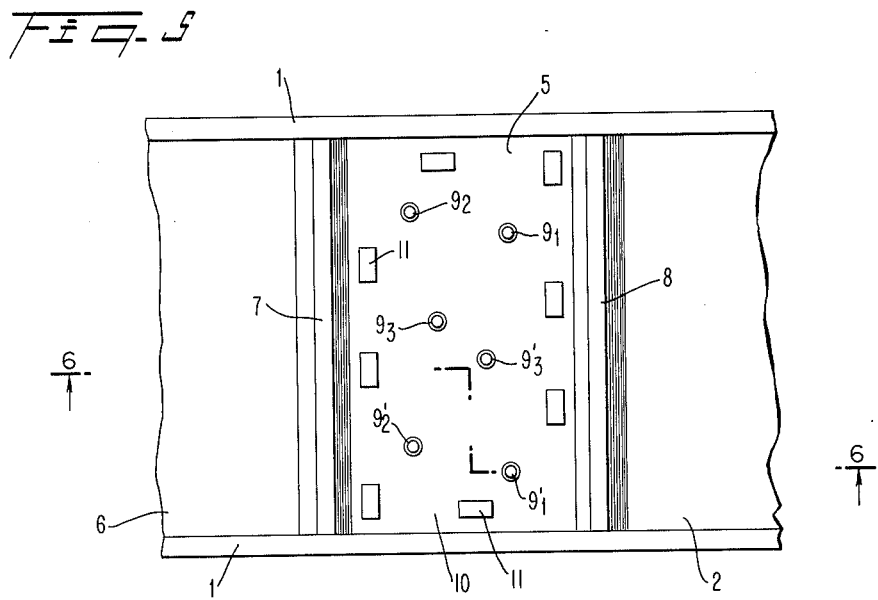
FIG. 5 is a plan view on a different scale partly in section, showing a particular arrangement of the homogenizing chamber.

In FIGS. 1 and 2 there is illustrated a furnace having a tank T, a dome D, a melting section 1, into which the raw materials are fed, and flame ports 4, through which heat is delivered above the glass. A homogenizing zone 10 is provided by laterally extending walls 7 and 8, the tops of which are in a position just below the level of the glass in the furnace and the bottoms of which extend below the general level 6 of the sole of the furnace. It may be assumed that this furnace is mounted on the floor of the furnace room as in ordinary practice except that the bottom 5 of the homogenizing compartment 10 is exposed to contact with the air of the furnace room to provide the desired cooling effect. A row of electrodes 9, four in number, extend across the chamber 10. These are vertically adjustable electrodes of rod type entering through the sole of the chamber which are supplied with electricity and made adjustable in height by standard means. They operate by Joule effect to heat the glass in a line extending laterally across the furnace, thus establishing ascending currents of glass which become hotter as they rise along and between the electrodes until they reach the surface of the bath, where they spread out until they approach and flow down the walls of the chamber. The flame from one of the ports 4 flows over these surface currents and further heat them. The glass from the melting zone 1 flows over the wall 7, down along the wall to the bottom and up the electrodes. As the machine associated with the working zone 3 of the furnace draws glass from the tank there is established a flow, longitudinally of the tank, which draws glass over the wall 8 into the plaining compartment 2. Being very hot from the combined heating, the glass tends to remain on the surface in the plaining zone where it is subjected to further heating from one of the ports 4 and readily loses its residual bubbles. The glass then flows downstream toward the working zone and the machines.

In FIGS. 3 and 4 there is shown an advanced form of the invention which conforms to FIG. 1 but which is supplied in addition with a row of bubblers 20 outside the upper wall 7 of the homogenizing chamber, and with the rod type coolers of my invention, 11, which are spaced about the walls in staggered relation to the electrodes. These cooling rods are internally hollow and are supplied with air or other cooling fluid through pipes 11'. The rods enter through the bottom of the chamber and are adjustable in height vertically like the electrodes. The cooling rods are preferably made of graphite but they can be made of the same refractory material which is employed in the wall of the furnace. If the glass in the melting zone is not very hot it tends to sink along side the upstream wall of the chamber, a tendency which is opposed by the bubblers 20. These bubblers may be used or not according to the judgment of the furnace man in the light of the glass which he is making. Within the chamber the effect of the cooling rods is to protect the walls of the chamber against the hot energy of the currents established by the electrodes and to accelerate those currents by cooling them. Thus, the glass in the center of the zone is heated by Joule effect by its own resistance and rises with increasing speed along the electrodes, flows laterally toward the walls, begins to descend, and descends more rapidly as the cooling effect of the coolers is felt. The cooling effect of the coolers is limited to the control of currents, and the protection of the walls, and is not intensified to the point where they will form stiff glass.

Figure 6:
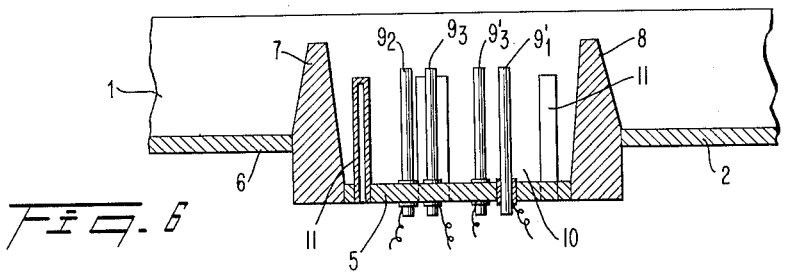
FIG. 6 is a section on the line 6—6 of FIG. 5.

In FIGS. 5 and 6 is shown an arrangement for a somewhat larger chamber than that of FIG. 1. In this chamber six electrodes 9 occupy the chamber in staggered relation to each other and to coolers 11. The electrodes are arranged in two groups of three which are served by three phase current, of which electrodes $9_3$ and $9'_3$ are connected to a single phase, electrodes $9_2$ and $9'_2$ to another phase, etc. The principle is applicable to any number of three phase units. The arrangement of the coolers, or their elimination is to be controlled by the needs of a particular operation, in the determination of which the nature of the raw materials and the characteristics of the glass will play a leading part.

Figure 7:
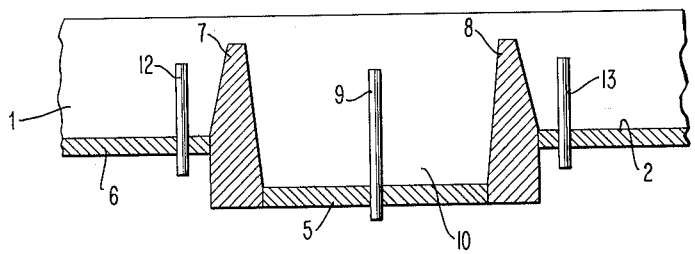
FIG. 7 is a vertical sectional view through a modification.

In FIG. 7 is illustrated a modification in which a single line of electrodes 9 occupies the chamber while a line 12 of electrodes before the wall 7 boosts the hottest glass from the melting zone 1, over the wall, and a line of electrodes 13 opposes any tendency of the hot glass, from chamber 10, to sink to the bottom.

The apparatus gives complete control of the flow of glass through the chamber and largely confines the fining of the glass to set bounds which do not permit the disturbance of adjacent zones by the active currents in the chamber. The apparatus improves the fining of glass by improved working, mingling, and homogenization apart from the plaining and working zones. By limiting the hottest glass and the most active currents to the confined volume of the chamber, it is possible to use higher temperatures when they are valuable, swifter currents, and more thorough mixing of the molten mass.

Straight above either of walls 7 or 8, if desired, a dam, in particular a floating dam may be placed at a controllable height to regulate the flow of glass passing above said wall from one compartment into next.

Other advantages are the attainment of the objects of the invention and those which will be obvious to persons skilled in the art.

As many apparently widely different embodiments of the present invention may be made without departing from the spirit and scope thereof, it is to be understood that the invention is not limited to the specific embodiments.

What is claimed is:

1. A glass furnace of continuous flow type which comprises a tank along which molten glass flows from the loading to the discharge end, transverse walls extending across the tank and establishing a homogenizing chamber in the fining zone where the highest temperature of glass is attained between an upstream melting zone and a downstream plaining zone, said walls extending upward to a position in the upper levels of the glass and below its surface, and extending downward below the levels of the bottoms of the melting and plaining zones, the central homogenizing chamber thus provided being deeper than the adjacent upstream and downstream zones, the inlet to and discharge from which are over the tops of the said walls, electrodes mounted adjacent the sole of the homogenizing chamber sufficiently spaced from its walls to avoid interference with descending currents of glass, and cooling means interposed in the space between the electrodes and a wall of the chamber.

2. A glass furnace having a refining chamber for molten glass with vertical walls extending above and below the levels of the bottoms of zones upstream and downstream of said chamber, the access to and discharge of glass from the chamber being over its upstream and downstream walls, electrodes centrally located in the chamber adapted to heat the glass by Joule effect, and cooling means peripherally interposed between the electrodes and the walls.

3. A glass furnace according to claim 1, also having electrodes outside and adjacent a wall of the chamber, whereby to act on glass currents adjacent said wall.

4. A glass furnace according to claim 1 also having bubblers outside and adjacent a wall of the chamber, whereby to act on glass currents adjacent said wall.

5. A glass furnace according to claim 1 also including means to heat the glass from above.

6. A glass furnace according to claim 1 in which the heating means includes rod electrodes and the cooling means are rod-like and are staggered with respect to the electrodes.

7. A tank furnace for the manufacture of glass and the like having, in the fining zone where the glass reaches its highest temperature, a compartment the sole of which is offset below the level of the soles of the compartments on either side thereof, the sides of which comprise the sides of the furnace and submerged cross walls which extend upward from the offset sole and approach the level of the glass, thereby providing access and discharge to the glass at the surface of the bath, the offset part of which is subjected to cooling effects outside of the furnace, and a line of electrode means in the compartment mounted adjacent the offset sole and centrally located between the cross walls and extending across the main current of glass flowing along the furnace so as to produce an ascending current of hot glass extending laterally of the furnace between the cross walls, the electrodes and the cooled part of the offset combining to accelerate the convection currents and improve the homogenization of the glass.

References Cited by the Examiner

UNITED STATES PATENTS

| 2,119,949 | 6/1938 | Blau et al. | 65—347 X |
| 2,490,339 | 12/1949 | DeVoe | 65—135 |
| 2,512,761 | 6/1950 | Arbeit | 65—136 |
| 2,658,095 | 11/1953 | Arbeit et al. | 65—135 X |
| 2,888,781 | 6/1959 | Fraser | 65—178 |
| 2,975,224 | 3/1961 | Burch | 65—347 X |

FOREIGN PATENTS

| 221,530 | 5/1959 | Australia. |
| 822,818 | 11/1959 | Great Britain. |

DONALL H. SYLVESTER, *Primary Examiner.*